S. UMIN 3,546,536
...L AND CUT OFF EXCESSIVE X-RADIATION FROM TELEVISION SETS
Filed March 28, 1968

TX 5117
X 5172

INVENTOR
STANLEY UMIN
BY Max R. Millman
ATTORNEY 3,546,536

MEANS TO INDICATE, CONTROL AND CUT OFF EXCESSIVE X-RADIATION FROM TELEVISION SETS

Stanley Umin, 2500 S. 6th St., Philadelphia, Pa. 19148

Filed Mar. 28, 1968, Ser. No. 716,772
Int. Cl. H02h 3/20, 7/20
U.S. Cl. 317—31 6 Claims

ABSTRACT OF THE DISCLOSURE

In a television set, a circuit including a glow lamp indicating when the voltage to the picture tube exceeds a level at which excessive X-radiation emanates therefrom, the circuit including means to reduce the overvoltage to a safe level and if the overvoltage exceeds a predetermined value to cut off the B+ supply to the set while the glow lamp remains lit.

With the advent of color television has come the problem of exposure by viewers to dangerous levels of X-radiation which primarily emanates from the picture tube when the input to its anode exceeds 25 kv. Mere reliance on shielding of the sources and correct initial setting of the high voltage is not sufficient, for malfunction of the high voltage adjustment circuit and shunt regulator tube, among other things, can occur during the operation of the set which will raise the voltage above 25 kv. in any event, and when this occurs steps should be taken promptly to protect the viewer from the dangerous X-rays which will emanate from the set at that time.

The primary object of this invention is to provide a glow lamp circuit which is built into the television set and operates off the line to the picture tube anode which is pre-set to cause a glow lamp to light up when the voltage to the picture tube anode exceeds 25 kv., thus signaling the viewer that X-rays are emanating at a dangerous level from the set.

Another object of the invention is to provide a television set with a built-in glow lamp circuit of the character described in which the glow lamp is operatively connected via a transistor circuit to the horizontal output tube and is fed back to the fly back transformer so that not only will the glow lamp light up due to a voltage in excess of 25 kv. but the picture will also shrink or become extinguished and reduce the voltage to the picture tube, thus acting to control or offset the overvoltage.

Another object of the invention is to provide a built-in indicator and control circuit for a television set of the character described in which by the use of a latch type relay operatively connected to the power transformer, B+ rectifiers and circuit containing the glow lamp and horizontal output tube, when the voltage exceeds a predetermined level above 25 kv., i.e., 25.25 kv., the glow lamp will remain lit but the power feed to the B+ circuit will be cut off, thus rendering the television set inoperative to supply any X-radiation whatever, yet the viewer will know that the set must be repaired with respect to those functions which are providing the dangerously excessive voltage of 25.25 kv. or more.

These and other objects of the invention will become more apparent as the following description proceeds in conjunction with the accompanying drawings, wherein.

Specific reference is now made to the drawings in which similar reference characters are used for corresponding elements throughout.

Figure 1:
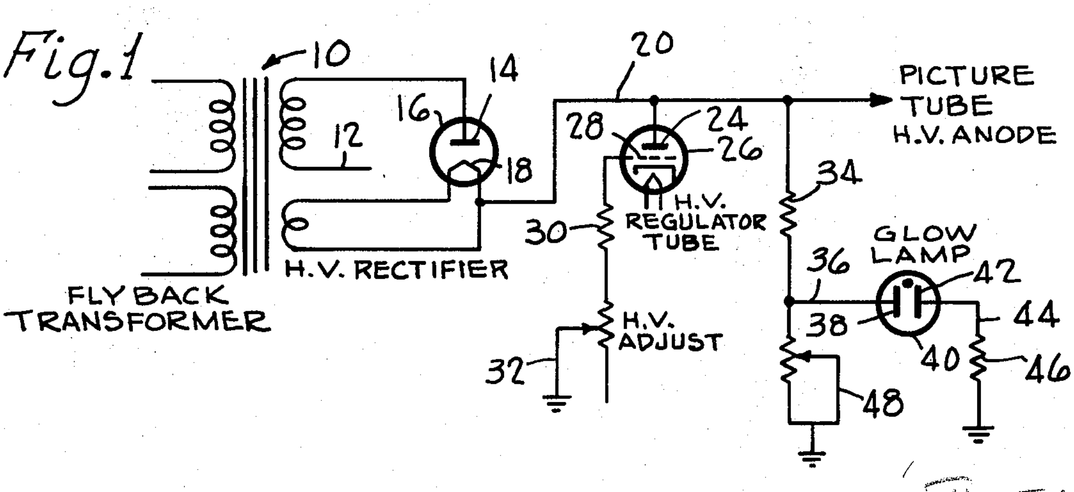
FIG. 1 is a circuit diagram of a simplified high voltage control circuit for color television incorporating the present invention when used solely for signaling or indicator purposes.

In virtually all color television receivers or sets currently available, about 25 kv. are fed to the picture tube through a control circuit. As seen in FIG. 1, the essentials of this circuit are a fly back transformer 10 whose secondary 12 is connected to the plate 14 of a high voltage rectifier 16, the cathode 18 of which is in turn connected by lead 20 to the H.V. anode of a conventional color television picture tube. The line 20 is also connected to the plate 24 of a high voltage regulator tube 26 whose grid 28 is connected to a biasing resistor 30 which is adjustably pre-set by potentiometer 32, generally of the screw type mounted on the rear skirt of the chassis of the television set. What has thus far been described is conventional and simplified in the sense that it excludes the damper circuit, output circuit, focus circuit, etc., which are required for complete operation of the set. The inclusion of these circuits is not essential to an understanding of the present invention.

When the voltage to the picture tube anode exceeds 25 kv. and this can be due among other things to a malfunction of the H.V. rectifier and/or the H.V. regulator tube, the picture tube will radiate X-rays of excessive and hence dangerous magnitude without the viewer knowing this. This is especially hazardous to those who have a propensity to sit close to the set, such particularly as children, and of course to all who operate the controls of the set.

In accordance with the present invention, a high voltage dropping resistor 34, i.e., in the order of magnitude of 100 megohm, is tapped off line 20 to the picture tube anode which connects via lead 36 to one side 38 of a glow discharge means such as tube or lamp 40, the other side 42 of which goes to ground via lead 44 containing resistor 46. A potentiometer 48 is connected to the lead 36 which is adjustably pre-set so that when the voltage to the picture anode exceeds 25 kv. the tube or lamp 40 will glow steadily. The lamp 40 will be mounted on the front of the cabinet or housing of the television set so that when the viewer sees it aglow he will know immediately that X-rays are emanating from the picture tube at a dangerous level and that he must first remain a good distance from the set and then take steps to repair the malfunction causing the overvoltage.

Figure 2:
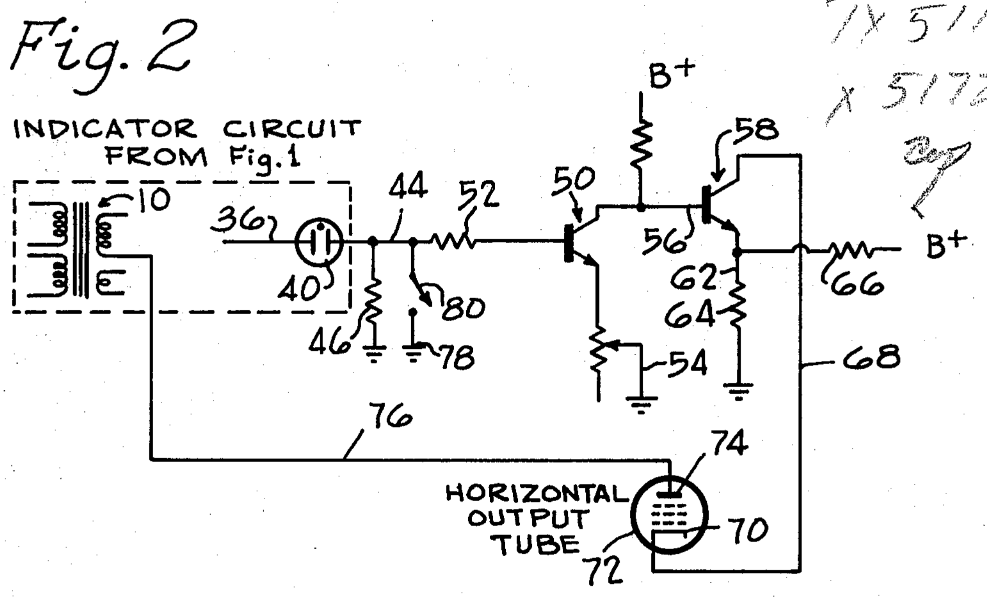
FIG. 2 is a circuit diagram incorporating that of FIG. 1 and illustrating the added voltage reducing function.

Coming now to FIG. 2, the indicator circuit of FIG. 1 is operatively connected to a control or overvoltage reducing circuit. Thus the lead 44 from the output side of the glow lamp 40 goes to the base of a first NPN transistor 50 through a resistor 52, the emitter of the transistor going to ground through a potentiometer 54. The collector of the first transistor 50 is connected by lead 56 to the base of a second similar NPN transistor 58, the B+ supply (not shown) feeding to the lead 56 through a resistor 60. The emitter of the second transistor 58 goes to ground via a lead 62 containing a biasing resistor 64, the line 62 also being connected to the B+ supply through another resistor 66. The collector of the second transistor 58 is connected by line 68 to the cathode 70 of a horizontal output tube 72, the anode 74 of which is connected by lead 76 back to the secondary of the fly back transformer 10.

Thus when the voltage of the picture tube anode exceeds 25 kv., the lamp 40 glows and the output side of the lamp develops a positive voltage, i.e., in the order of magnitude of about 20 volts. This voltage into the first transistor 50 is increased by biasing resistor 52 and the transistor begins to conduct. The current emitting from the first transistor 50 causes the second transistor 58 to cut off and resistance increases through the transistor circuit feeding line 68 thus causing an increase in voltage to the cathode 70 which in turn causes the horizontal output tube 72 to cut off. In so doing the picture will either shrink horizontally or go off entirely. However, since the anode 74 of the tube 72 feeds back to the secondary of the fly back transformer 10 feeding the picture tube anode, the voltage to the picture tube will thus drop off accordingly. If the malfunction causing the voltage in excess of 25 kv. to the picture tube is not thereby corrected, the viewer will see the glow lamp light, then the picture shrink or go off, then the picture go on properly and the glow lamp go out, and this process will repeat itself until help is sought to repair the malfunction causing the overvoltage and hence emission of dangerous levels of X-ray. The line 44 from the glow lamp 40 is grounded as at 78 via a normally open manually operable switch 80. When the repairman closes the switch he will restore current to the high voltage control circuit and thus undertake to find the malfunction.

Figure 3:
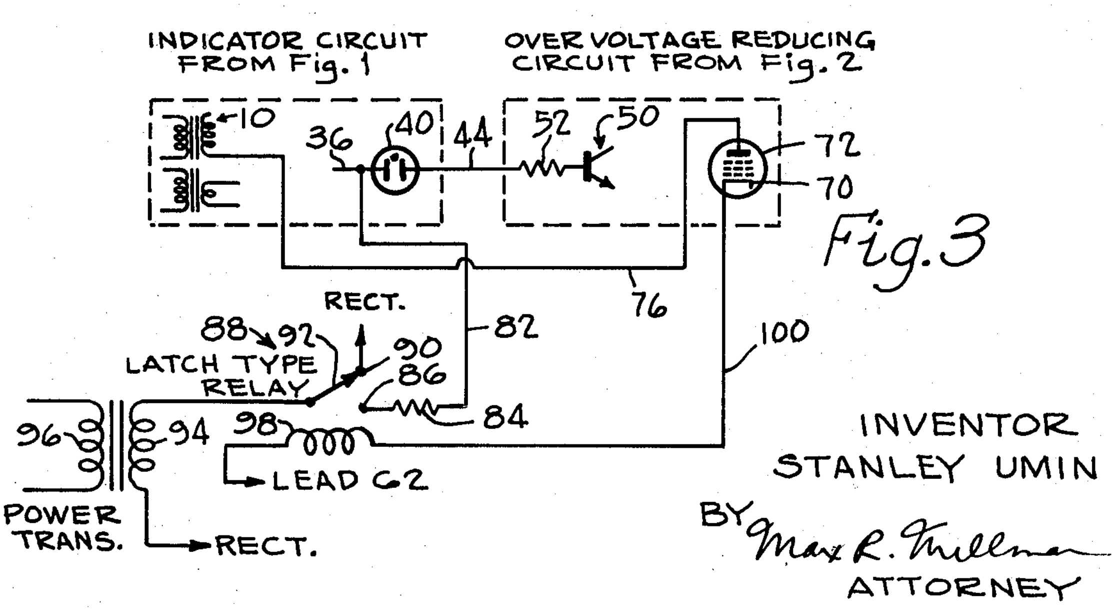
FIG. 3 is a circuit diagram incorporating the circuits of FIGS. 1 and 2 and illustrating the added voltage cut off function at a predetermined overvoltage while the indicator circuit of FIG. 1 remains operative.

FIG. 3 adds to the circuit of FIG. 2 a voltage cut-off function without cutting off the indicator function. Thus when the voltage to the picture tube anode reaches 25.25 kv. (25,250 volts), the X-ray emanation may be sufficiently dangerous to warrant completely extinguishing the operation of the set. To accomplish this, a circuit is provided in which the glow lamp input lead 36 is connected by lead 82 to a resistor 84 which is in turn connected to a first fixed normally open contact 86 of a latch type relay 88. The second fixed normally closed contact 90 is connected to the rectifiers (not shown) which convert AC to DC before feed back to the B+ supply. The movable contact 92 of the relay which normally engages the second fixed contact 90 is connected to the secondary 94 of a power transformer 96 which is part of the power supply to the set. The coil 98 of the relay is connected by lead 100 to the cathode 70 of the horizontal output tube 72, the other end of the coil being connected to lead 62 of FIG. 2.

Thus when the voltage to the picture tube anode reaches or exceeds 25.25 kv., the lamp 40 will glow and by means of the transistor circuit, the voltage to the cathode 70 will increase. This increased voltage will also appear in line 100 thereby energizing the coil 98 of the relay 88 which will pull movable contact 92 away from contact 90 and into locking engagement with contact 86, thus breaking the circuit to the rectifiers and the B+ supply, cutting off the television set but completing the circuit to the glow lamp 40. In other words at or above 25.25 kv. the picture tube and circuit feeding it will cut off entirely but the lamp 40 will still glow indicating to the viewer and ultimately to the serviceman that there is a malfunction in the set acting to provide 25.25 kv. or more to the picture tube, but since the set has cut off, the viewer cannot be subjected in the meanwhile to dangerous levels of X-radiation emanating from the set.

While preferred embodiments of the invention have been here shown and described, it will be understood that skilled artisans may make minor variations without departing from the spirit of the invention and the scope of the appended claims.

I claim:

1. In a television set including a high voltage circuit consisting essentially of a fly back transformer feeding voltage to the anode of a picture tube with a high voltage rectifier operatively connected between the transformer and the anode of the picture tube; an indicator exterior of the picture tube and operative when the voltage exceeds 25 kv. to the anode comprising a glow lamp, a high voltage dropping resistor connected between the picture tube anode and the input side of the glow lamp, the high voltage dropping resistor being connected in turn to ground through a potentiometer pre-set so that the lamp will glow only when the voltage in the line to the picture tube anode exceeds 25 kv.

2. In a television set including a high voltage circuit consisting essentially of a fly back transformer feeding voltage to the anode of a picture tube with a high voltage rectifier operatively connected between the transformer and the anode of the picture tube; an indicator operative when the voltage exceeds 25 kv. to the anode comprising a glow lamp, a high voltage dropping resistor connected between the picture tube anode and the input side of the glow lamp, the high voltage dropping resistor being connected in turn to ground through a potentiometer pre-set so that the lamp will glow only when the voltage in the line to the picture tube anode exceeds 25 kv., and an overvoltage reducing circuit comprising a horizontal output tube whose anode is connected to the secondary of the fly back transformer and a voltage increasing circuit connected between the output side of the glow lamp and the cathode of the horizontal output tube.

3. The combination of claim 2 wherein said voltage increasing circuit includes a first transistor connected to the output side of the glow lamp through a resistor, and a second transistor directly coupled to the first transistor, the collector of the second transistor being connected to the cathode of the horizontal output tube so that the voltage from the glow lamp output increases through the resistor to the first transistor causing it to conduct and the second transistor to cut off thereby increasing the resistance and voltage to the cathode of the horizontal output tube, and thus causing the latter to cut off wherein the picture of the picture tube shrinks or cuts off and the voltage output of the fly back transformer also drops.

4. The combination of claim 3 and a manually operable normally open switch connected between ground and the lead from the output side of the glow lamp in advance of the resistor to the first transistor to reactivate the high voltage circuit to the picture tube.

5. The combination of claim 2 and an overvoltage responsive cut-off circuit including a latch type relay having a first fixed contact operatively connected to the rectifiers to the B+ circuit, a second fixed contact connected to the input side of the glow lamp, a coil operatively connected between the cathode of the horizontal output tube and a voltage point of the overvoltage reducing circuit, and a movable contact, said cut-off circuit further including a power transformer whose secondary is connected to the movable contact of the relay, the movable contact normally engaging the first fixed contact of the relay and moving into engagement with the second fixed contact in response to a voltage of 25.25 kv. feeding to the picture tube anode whereby the B+ circuit cuts off and the circuit of the glow lamp remains closed and the lamp remains lit.

6. The combination of claim 3 and an overvoltage responsive cut-off circuit including a latch type relay having a first fixed contact operatively connected to the rectifiers to the B+ circuit, a second fixed contact connected to the input side of the glow lamp, a coil operatively connected between the cathode of the horizontal output tube and the second transistor, and a movable contact, said cut-off circuit further including a power transformer whose secondary is connected to the movable contact of the relay, the movable contact normally engaging the first fixed contact of the relay and moving into engagement with the second fixed contact in response to a voltage of 25.25 kv. feeding to the picture tube anode whereby the $B^+$ circuit cuts off and the circuit of the glow lamp remains closed and the lamp remains lit.

References Cited

UNITED STATES PATENTS

| | | | |
|---|---|---|---|
| 2,437,876 | 3/1948 | Cohn | 328—148X |
| 2,815,445 | 12/1957 | Young et al. | 317—51X |
| 3,267,321 | 8/1966 | Gressford | 317—51X |

JAMES D. TRAMMELL, Primary Examiner

U.S. Cl. X.R.

178—7.3; 315—120; 317—51; 325—362; 328—9